(12) United States Patent
Fluhrer

(10) Patent No.: US 7,962,743 B2
(45) Date of Patent: Jun. 14, 2011

(54) SYSTEM AND METHOD FOR PROTECTED SPOKE TO SPOKE COMMUNICATION USING AN UNPROTECTED COMPUTER NETWORK

(75) Inventor: Scott Fluhrer, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 966 days.

(21) Appl. No.: 11/419,583

(22) Filed: May 22, 2006

(65) Prior Publication Data

US 2007/0271451 A1 Nov. 22, 2007

(51) Int. Cl.
*H04L 29/06* (2006.01)
*G06F 15/173* (2006.01)
*G06F 17/30* (2006.01)

(52) U.S. Cl. ........ 713/153; 713/150; 713/151; 713/152; 713/162; 713/163; 709/238; 709/239; 709/242; 709/243; 726/2; 726/3; 726/12; 726/14; 726/15

(58) Field of Classification Search .......... 713/150–153, 713/162–163; 726/2, 3, 12–15; 709/238–244
See application file for complete search history.

(56) References Cited

U.S. PATENT DOCUMENTS

| | | | |
|---|---|---|---|
| 7,046,662 B1 | 5/2006 | Saluja et al. | |
| 7,184,437 B1 | 2/2007 | Cole et al. | |
| 7,234,063 B1 | 6/2007 | Baugher et al. | |
| 7,298,839 B2 | 11/2007 | Eisentraeger et al. | |
| 7,308,706 B2 | 12/2007 | Markham et al. | |
| 7,366,894 B1 * | 4/2008 | Kalimuthu et al. | 713/153 |
| 7,447,901 B1 * | 11/2008 | Sullenberger et al. | 713/153 |
| 7,486,795 B2 | 2/2009 | Eschenauer et al. | |
| 7,536,715 B2 | 5/2009 | Markham | |
| 7,594,262 B2 | 9/2009 | Hanzlik et al. | |
| 7,596,690 B2 | 9/2009 | Singh | |
| 7,657,036 B2 | 2/2010 | Hsu et al. | |
| 7,720,995 B2 | 5/2010 | Wainner et al. | |
| 7,840,810 B2 | 11/2010 | Eastham | |
| 2003/0126265 A1 | 7/2003 | Aziz et al. | |
| 2003/0191937 A1 * | 10/2003 | Balissat et al. | 713/163 |
| 2007/0016663 A1 | 1/2007 | Weis | |
| 2007/0248225 A1 | 10/2007 | Fluhrer | |
| 2008/0320303 A1 | 12/2008 | Khalid et al. | |
| 2009/0097417 A1 | 4/2009 | Asati et al. | |
| 2009/0157901 A1 | 6/2009 | Asati et al. | |

OTHER PUBLICATIONS

Configuring DMVPN Spoke Router in Full Mesh IPsec VPN Using SDM; Publisher: Cisco Systems; Year: 2004.*
Diffie-Hellman Key Exchange; Book: Handbook of Applied Cryptography; Authors: Menezes et al; Publisher: CRC Press LLC; Year: 1997.*

(Continued)

*Primary Examiner* — Taghi T Arani
*Assistant Examiner* — Madhuri Herzog
(74) *Attorney, Agent, or Firm* — Schwegman, Lundberg & Woessner, P.A.

(57) ABSTRACT

Various embodiments of the disclosed subject matter provide methods and systems for improved efficiency and security in spoke-to-spoke network communication. Embodiments provide systems and methods for registering a spoke with a hub, updating a hub registration table with spoke registration information, sending the updated hub registration table to a plurality of registered spokes, using the updated hub registration table at a sending spoke to encrypt traffic to be sent to another spoke, and using the updated hub registration table at a receiving spoke to decrypt traffic received from another spoke.

31 Claims, 7 Drawing Sheets

OTHER PUBLICATIONS

*Dynamic Multiport VPN (DMVPN) Design Guide*, [online]. Cisco Systems, Inc., San Jose, CA, [retrieved on Sep. 7, 2009]. Retrieved from the internet: <URL: http://web.archive.org/web/*/www.cisco.com/>>, (2006), 101 pgs.

Frey, G., et al., "The Tate Pairing and the Discrete Logarithm Applied to Elliptic Curve Cryptosystems", [online]. Oct. 7, 1998. [retrieved on Sep. 29, 2010]. Retrieved from the Internet: <URL: www-rcf.usc.edu/~mdhuang/cs599/frey98tate.pdf>, 5 pgs.

Luciani, J., et al., "NBMA Next Hop Resolution Protocol (NHRP)", Network Working Group, Request for Comments: 2332, (Apr. 1998), 53 pgs.

Rekhter, Y., et al., A Border Gateway Protocol 4 (BGP-4), RFC 4271, [retrieved Mar. 2010], IETF, <http://tools.ietf.org/html/rfc4271>, (Jan. 2006), 105 pgs.

\* cited by examiner

Hub Registration Table / 107

| Index | Spoke IP Address | Spoke Subnet Address | Spoke Public Keying Value |
|---|---|---|---|
| 1 | 11.11.11.11 | 10.1.1.4/30 | 12345 |
| 2 | 22.22.22.22 | 10.2.2.0/24 | 23456 |
| 3 | 33.33.33.33 | 10.3.3.3/32 | 34567 |
| 4 | 44.44.44.44 | 10.4.0.0/16 | 45678 |

Figure 5

SYSTEM AND METHOD FOR PROTECTED SPOKE TO SPOKE COMMUNICATION USING AN UNPROTECTED COMPUTER NETWORK

CROSS-RELATED APPLICATIONS

This application is related to U.S. application Ser. No. 11/379,920, entitled, "SYSTEM AND METHOD FOR ENCRYPTED GROUP NETWORK COMMUNICATION WITH POINT-TO-POINT PRIVACY", filed on Apr. 24, 2006, and assigned to Cisco Technology, Inc.

TECHNICAL FIELD

The disclosed subject matter relates to the field of computer network communications, and more particularly to methods and systems providing protected spoke to spoke communication using an unprotected computer network.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006 Cisco Systems, Inc. All Rights Reserved.

BACKGROUND

A Virtual Private Network (VPN) is a logical network that uses insecure public telecommunications, such as the Internet, to provide secure communications to members of the VPN. A VPN seeks to provide the security associated with dedicated communication lines but without requiring the necessary hardware and at a fraction of the cost, which is typically associated with dedicated communication lines.

A VPN works by using shared public infrastructure while simultaneously maintaining privacy through agreed upon security procedures and protocols. Essentially, a VPN uses custom encryption to encrypt messages communicated via the VPN. The encryption and decryption of messages rely upon keys that are securely held by participants of the VPN.

Dynamic Multipoint VPN (DMVPN) is an enhancement of the virtual private network configuration process of conventional network routers. DMVPN prevents the need for pre-configured (static) IPsec peers in the network. IPsec (IP security) is a standard for securing Internet Protocol (IP) communications by encrypting and/or authenticating all IP packets communicated among the network peers. IPsec provides security at the network layer. The DMVPN functionality of conventional network routers allows greater scalability over previous IPsec configurations. An IPsec tunnel between two conventional network routers may be created on an as needed basis. Tunnels may be created between a spoke router and a hub router (VPN headend) or between spokes. This greatly alleviates the need for the hub to route data between spoke networks, as was common in a non-fully meshed frame relay topology.

In DMVPN, network traffic can traverse from one spoke to another. Initially, the network traffic is routed from a first spoke (e.g. Spoke A) to the hub and then from the hub to a second spoke (e.g. Spoke B). At the same time, DMVPN establishes a tunnel from Spoke A to Spoke B. Once the tunnel from Spoke A to Spoke B is created, traffic will be routed via the tunnel. Unfortunately, conventional DMVPN causes a significant drop in the tunnel latency several seconds after the tunnel has been established. This sudden drop in tunnel latency can cause problems in servicing delay-sensitive network traffic.

Thus, a system and method for improved efficiency and security in spoke-to-spoke network communication is needed.

BRIEF DESCRIPTION OF THE DRAWINGS

FIG. 5 illustrates an example of the hub registration table of one embodiment.

DETAILED DESCRIPTION

Figure 1:
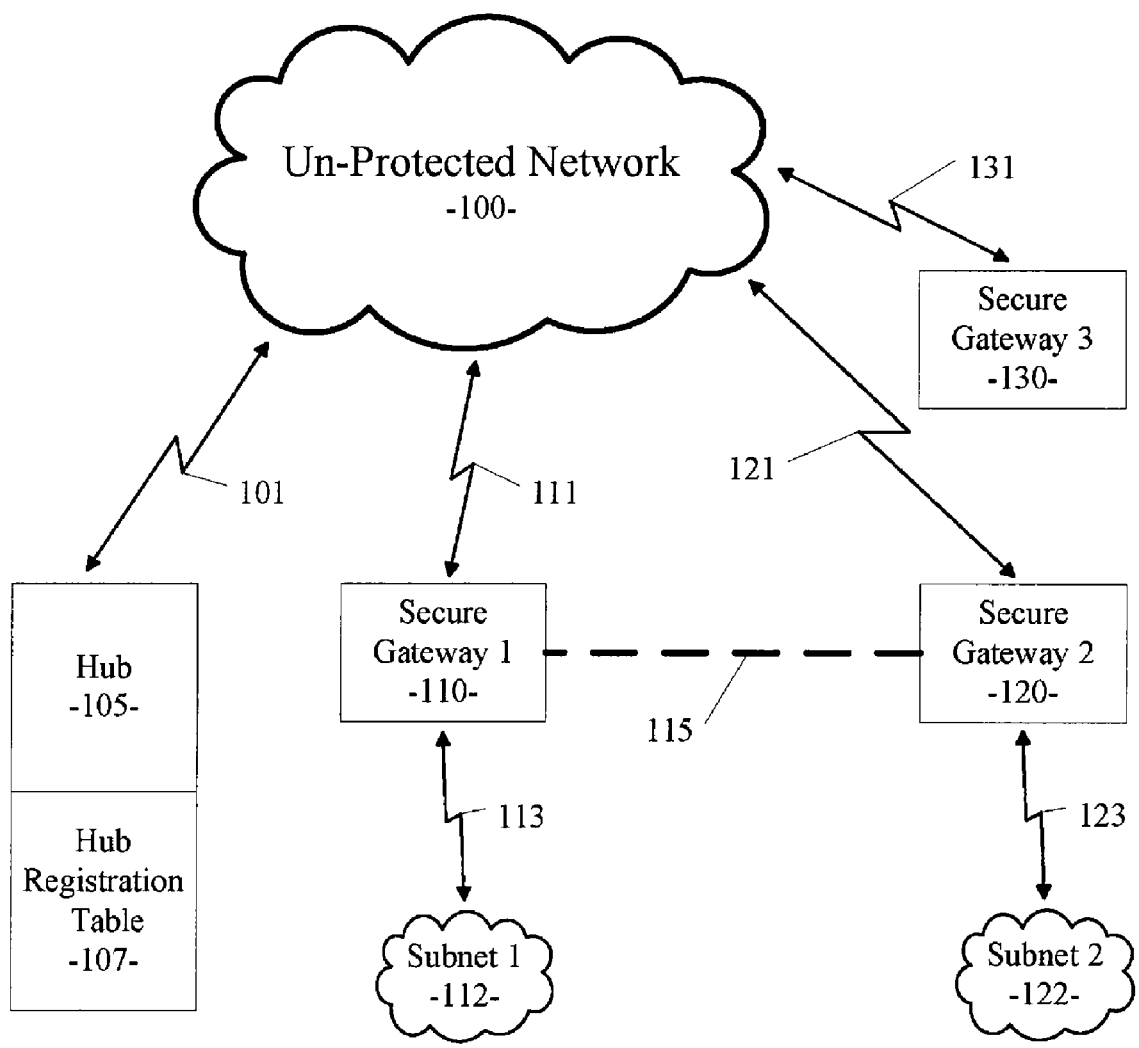
FIG. 1 illustrates the typical network environment of various embodiments.

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

As described further below, according to various example embodiments of the disclosed subject matter described herein, there is provided a system and method for improved efficiency and security in spoke-to-spoke network communication.

A DMVPN spoke is typically configured with one or more hub IP addresses. DMVPN hub IP addresses are typically static, such as at a corporate headquarters. DMVPN spoke IP addresses may be static or dynamic. An example would be a DMVPN spoke router acting as a DHCP (Dynamic Host Configuration Protocol) client on a DSL (digital subscriber loop) or cable provider's network. The spoke router is configured with the hub's IP address, allowing the spoke to connect with the hub when online. The hub router does not need to be configured with the IP addresses of the spoke routers. This allows many spoke VPN routers to be deployed without the need to configure additional peers on the hub(s). In the past, the configuration of the hub grew whenever a spoke VPN router was added to the IPsec network.

To avoid routing through the hub router for spoke-to-spoke traffic, NHRP (next hop resolution protocol) is often used for spoke discovery. A DMVPN spoke router learns of the static or dynamic IP address of other spoke routers, using NHRP. Additional IPsec tunnels are created as needed for spoke-tospoke traffic. These tunnels are torn down after they are no longer needed to conserve resources. This is a great benefit to delay sensitive traffic, such as IP telephony and other real-time applications. A spoke router's delay going through the hub to reach other spokes is now avoided, after the latency incurred during the initial set-up. For redundancy, a spoke router can be mapped to one or more DMVPN hubs.

Various embodiments described herein use a conventional form of Diffie-Hellman key generation as a cryptographic methodology. Such methodologies are well known to those of ordinary skill in the art. These conventional methods can be used to generate an encryption/decryption key from a pair of values, one value being a public value and the other value of the pair being a private value. In the description that follows, these values are denoted as Diffie-Hellman (DH) public values or private values. These values can be generated for each spoke using conventional techniques. It will be apparent to those of ordinary skill in the art that other equivalent cryptographic methodologies may also be employed.

Referring to FIG. 1, the typical network environment of various embodiments is illustrated. As shown, a hub router 105 is logically connected to three example gateways 110, 120, and 130 through an unprotected network 100, such as the Internet. The hub 105 and gateways 110, 120, and 130 can be implemented as conventional network routers. Gateways 110 and 120 each control access to a corresponding subnet 112 and 122, respectively. It will be apparent to those of ordinary skill in the art that many other gateways (generally denoted herein as spokes) and subnets will be interconnected in a typical network configuration. Additionally, well-known network routing and data transfer protocols can be used to transfer data between the hub and the spokes and between the spokes themselves via the network 100. In the manner described in more detail below, protected data communication between spokes can be accomplished via the unprotected network 100 without incurring the latency common in conventional systems.

In accordance with the various embodiments described herein, each spoke 110, 120, and 130 initially registers itself with hub 105. When a spoke registers with the hub 105, the spoke registers its IP address, protected subnet, and a DH public value as part of a set of spoke registration information. For example, when spoke 110 registers with hub 105, spoke 110 provides its own IP address, the identity of subnet 112, and the DH public value previously computed for spoke 110. When spoke 120 registers with hub 105, spoke 120 provides its own IP address, the identity of subnet 122, and the DH public value previously computed for spoke 120. The hub 105 stores the spoke registration information in a hub registration table 107 (also denoted NHRP table). Hub 105 thereby updates the hub registration table 107. In one embodiment, the hub 105 then sends the updated hub registration table 107 to all registered spokes, and the spokes then update their respective copies of the hub registration table 107. Subsequently as additional updates are made to the hub registration table, the hub 105 need only send the new/updated information to the registered spokes. In this manner, hub 105 updates all the spokes that are currently registered with a copy of the current updated hub registration table 107 (including DH public values for each registered spoke). An example of the structure of an embodiment of the hub registration table is shown in FIG. 5.

Referring to FIG. 5, hub registration table 107 is illustrated. As shown, an embodiment of hub registration table 107 includes a record with a set of spoke registration information for each registered spoke. The record for each registered spoke includes the IP address of the spoke, the subnet address for the spoke, and the DH public value or public key value for the spoke. As each spoke registers with hub 105, a record for the newly registered spoke is created in hub registration table 107 and the data items illustrated in FIG. 5 are updated for the new registering spoke. Hub 105 thereby updates the hub registration table 107. In one embodiment, the hub 105 then sends the updated hub registration table 107 to all registered spokes, and the spokes then update their respective copies of the hub registration table 107. In this manner, hub 105 updates all the spokes that are currently registered with an updated copy of the current hub registration table 107. It will be apparent to those of ordinary skill the art that an equivalent hub registration table 107 may be differently configured in other embodiments.

Referring again to FIG. 1, when a spoke needs to forward traffic to another spoke, the sender spoke first checks to determine if the sender spoke has a tunnel established with the receiver spoke. Such a tunnel is represented in FIG. 1 as dashed line 115 from sender spoke 110 to receiver spoke 120. It will be apparent to those of ordinary skill in the art that data transfer between a sender spoke and a receiver spoke through a tunnel occurs via unprotected network 100. If no tunnel was previously established, the sender spoke checks its copy of the hub registration table 107. If the sender spoke 110 finds the receiver spoke subnet 122 within the hub registration table 107, the sender spoke 110 combines its own DH private key value with the DH public key value of the receiver spoke 120 listed in the hub registration table 107 to form encryption keys. Next, the sender spoke 110 creates a tunnel 115 with that set of encryption keys, and sends the encrypted data packet (e.g. encrypted traffic) to the receiver spoke 120 via the tunnel 115. It will be apparent to those of ordinary skill in the art that the generated encryption keys can also be used to check the integrity of the data traffic as well as encrypting the traffic.

When the receiver spoke 120 receives an encrypted data packet (e.g. encrypted traffic) for which the receiver spoke 120 does not have a tunnel 115 established with the sender spoke 110, the receiver spoke 120 scans its copy of the hub registration table 107 for the source IP address of the sender spoke 110 identified in the received data packet. If the receiver spoke 120 finds the source IP address of the sender spoke 110 in the hub registration table 107, the receiver spoke 120 combines its own DH private key value with the DH public key value of the sender spoke 110 listed in the hub registration table 107 to form decryption keys. Because the encryption keys and the decryption keys are computed from the same related value pairs, the decryption keys can be used to produce a valid decryption of the data encrypted with the encryption keys created by the sender spoke 110. The receiver spoke 120 then creates a tunnel 115 with that set of decryption keys, and decrypts the data packet sent from the sender spoke 110 via the tunnel 115. It will be apparent to those of ordinary skill in the art that the generated decryption keys can also be used to check the integrity of the data traffic as well as decrypting the traffic.

In one embodiment, a full hub registration table 107 is maintained on all spokes. In addition, public DH key values for each spoke are also maintained within the hub registration table 107. The hub registration table 107 values are used as described herein to dynamically create encrypted tunnels between spokes on demand with no protocol delay. The embodiments described herein provide an advantage over conventional DMVPN in that spoke to spoke network traffic never needs to traverse the hub. As such, spoke to spoke network latency is reduced. Additionally, the embodiments described herein provide the additional advantage that only the sender spoke and the receiver spoke are able to intercept and decipher the encrypted data packets. In the example described above, spoke 130 is not able to intercept and decipher the encrypted data packets sent between spoke 110 and 120. Thus, unlike conventional group keying protocols, the embodiments described herein provide an improved level of network security. Further, the embodiments described herein provide the additional advantage that a spoke can discard a dynamically created tunnel at any time without even notifying other spokes. This feature of the various embodiments also improves network efficiency and speed. If necessary, the tunnel can be dynamically re-created without introducing significant network latency.

Figure 2:
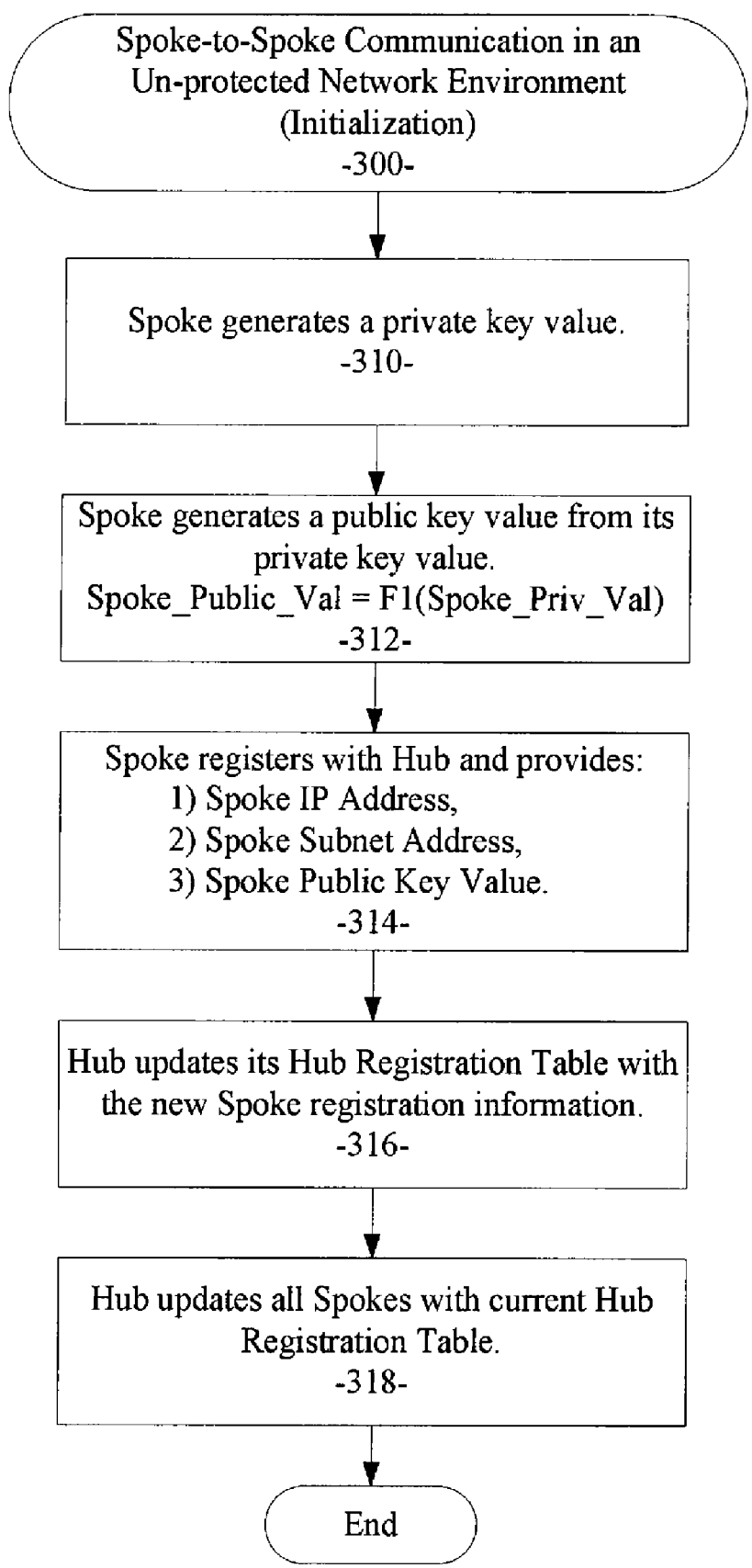
FIGS. 2-4 are processing flow diagrams that illustrate the processing flow in accordance with one example embodiment of the disclosed subject matter.
Figure 3:
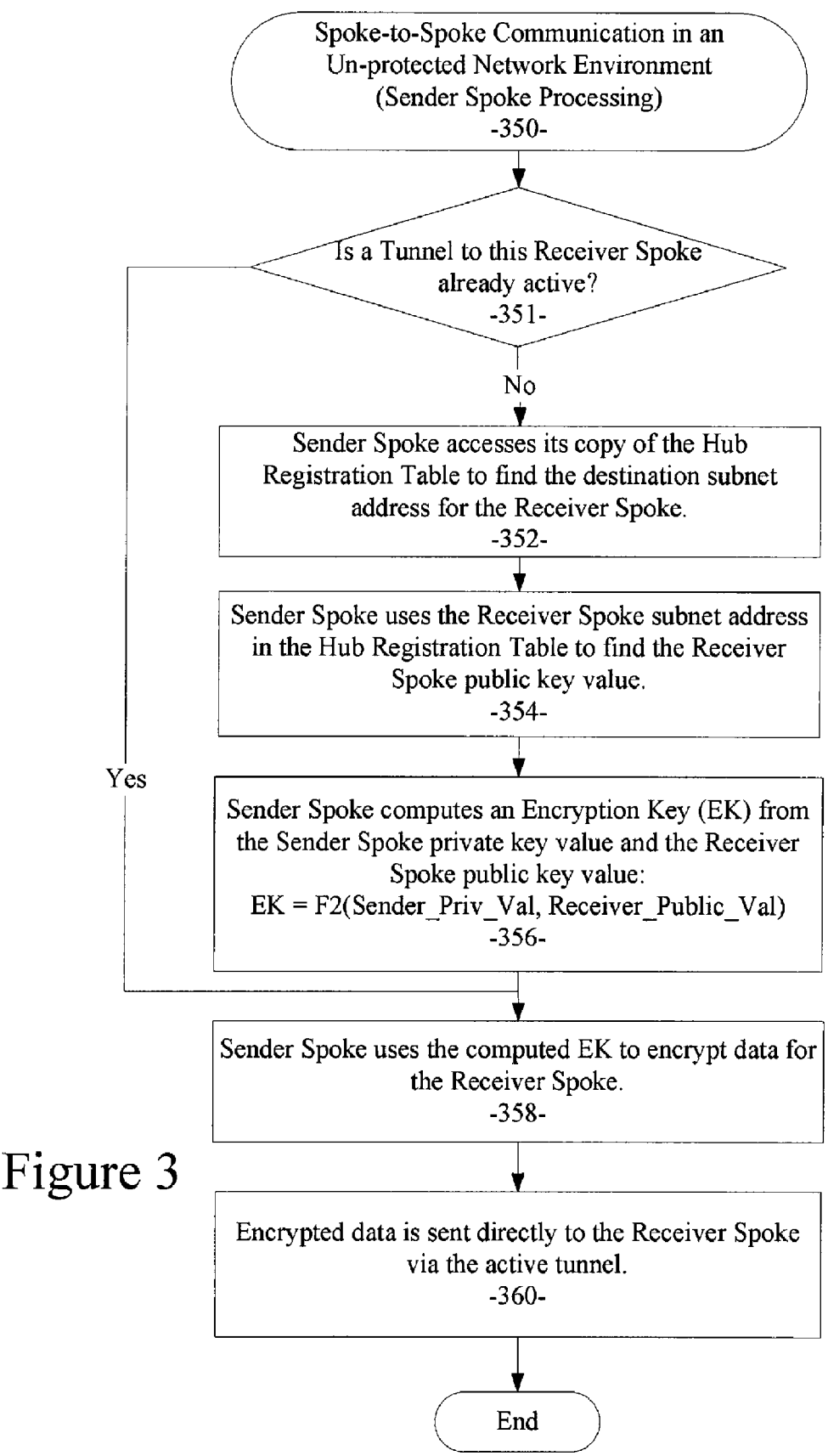
Figure 4:
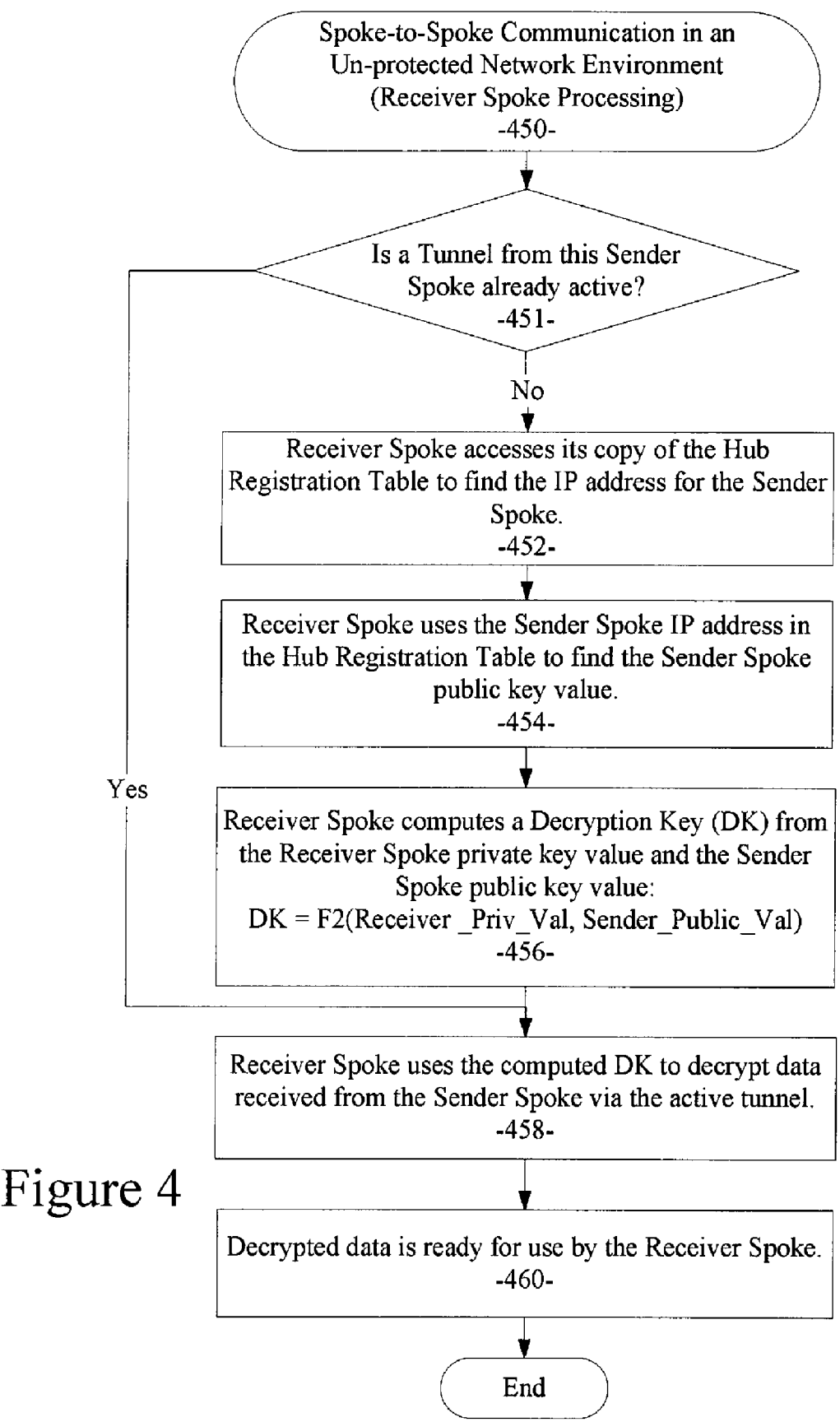

Referring now to FIGS. 2-4, flow diagrams illustrate the processing logic used in a sample embodiment. FIG. 2 shows a sequence of initialization tasks performed to set up the hub 105, the hub registration table 107, and registering spokes. In processing block 310, each spoke generates a private key value (DH private value) using for example, a Diffie-Hellman cryptographic methodology as described above. Note that the private key value for each spoke does not travel through unprotected network 100. In processing block 312, each spoke generates a public key value from its previously computed private key value. Using a conventional cryptographic function (denoted F1), the public key value for each spoke is generated by the spoke as provided in the following equation:

$$Spoke\_Public\_Val = F1(Spoke\_Priv\_Val)$$

In processing block 314, each spoke registers with hub 105 and provides to the hub, 1) the spoke IP address, 2) the spoke subnet address, and 3) the spoke public key value (Spoke_Public_Val) computed in processing block 312. In processing block 316, the hub 105 updates its hub registration table 107 with the new registration data received from each registering spoke. In processing block 318, the hub 105 then sends the updated hub registration table 107 to all registered spokes, and the spokes then update their respective copies of the hub registration table 107. In this manner, hub 105 updates all registered spokes with a current copy of the hub registration table 107. Initialization according to one embodiment then terminates at the end bubble illustrated in FIG. 2.

Referring to FIG. 3, processing logic for a sender spoke in one embodiment is illustrated. In decision block 351, the sender spoke determines if a tunnel to the intended receiver spoke has already been created. If a tunnel to the intended receiver spoke was previously created, it will not be necessary for the sender spoke to create an encryption key and open a new tunnel. In this case, an encryption key was previously created when a tunnel to the receiver spoke was created. Thus, processing control passes from decision block 351 on the "Yes" path to processing block 358, which is described in more detail below.

In decision block 351, if the sender spoke determines that a tunnel to the intended receiver spoke was not already created or is not currently active, processing control passes from decision block 351 on the "No" path to processing block 352. In this case, it will be necessary for the sender spoke to create an encryption key and open a new tunnel. In processing block 352, the sender spoke accesses its copy of the hub registration table 107 to find the destination subnet address for the intended receiver spoke. In processing block 354, the sender spoke uses the receiver spoke subnet address found in the hub registration table 107 to find the corresponding receiver spoke public key value. Next, the sender spoke uses the receiver spoke public key value to compute an encryption key. In processing block 356, the sender spoke computes an encryption key (EK) from the sender spoke private key value and the receiver spoke public key value. Using a conventional cryptographic function (denoted F2), the encryption key (EK) for the sender spoke is generated by the sender spoke as provided in the following equation:

$$EK = F2(Sender\_Priv\_Val, Receiver\_Public\_Val)$$

In processing block 358, the sender spoke uses the computed encryption key (EK) to encrypt data for the receiver spoke. The encrypted data can then be sent directly from the sender spoke to the receiver spoke via the active tunnel in processing block 360. Because only the sender spoke and the receiver spoke are privy to the public and private key values of the sender spoke and the receiver spoke, only the sender spoke and the receiver spoke can access and decipher the encrypted data sent via the tunnel. Processing for the sender spoke then terminates at the end bubble illustrated in FIG. 3.

Referring to FIG. 4, processing logic for a receiver spoke in one embodiment is illustrated. In decision block 451, the receiver spoke determines if a tunnel from the sender spoke has already been created. If a tunnel from the sender spoke was previously created, it will not be necessary for the receiver spoke to create a decryption key and open a new tunnel. In this case, a decryption key was previously created when a tunnel from the sender spoke was created. Thus, processing control passes from decision block 451 on the "Yes" path to processing block 458, which is described in more detail below.

In decision block 451, if the receiver spoke determines that a tunnel from the sender spoke was not already created or is not currently active, processing control passes from decision block 451 on the "No" path to processing block 452. In this case, it will be necessary for the receiver spoke to create a decryption key and open a new tunnel. In processing block 452, the receiver spoke accesses its copy of the hub registration table 107 to find the IP address of the sender spoke. In processing block 454, the receiver spoke uses the sender spoke IP address found in the hub registration table 107 to find the corresponding sender spoke public key value. Next, the receiver spoke uses the sender spoke public key value to compute a decryption key. In processing block 456, the receiver spoke computes a decryption key (DK) from the receiver spoke private key value and the sender spoke public key value. Using a conventional cryptographic function (denoted F2), the decryption key (DK) for the receiver spoke is generated by the receiver spoke as provided in the following equation:

$$DK = F2(Receiver\_Priv\_Val, Sender\_Public\_Val)$$

In processing block 458, the receiver spoke uses the computed decryption key (DK) to decrypt data received from the sender spoke via the active tunnel. The decrypted data can then be used by the receiver spoke in processing block 460. Again, because only the receiver spoke and the sender spoke are privy to the public and private key values of the receiver spoke and the sender spoke, only the receiver spoke and the sender spoke can access and decipher the encrypted data sent via the tunnel. Processing for the receiver spoke then terminates at the end bubble illustrated in FIG. 4.

Figure 6:
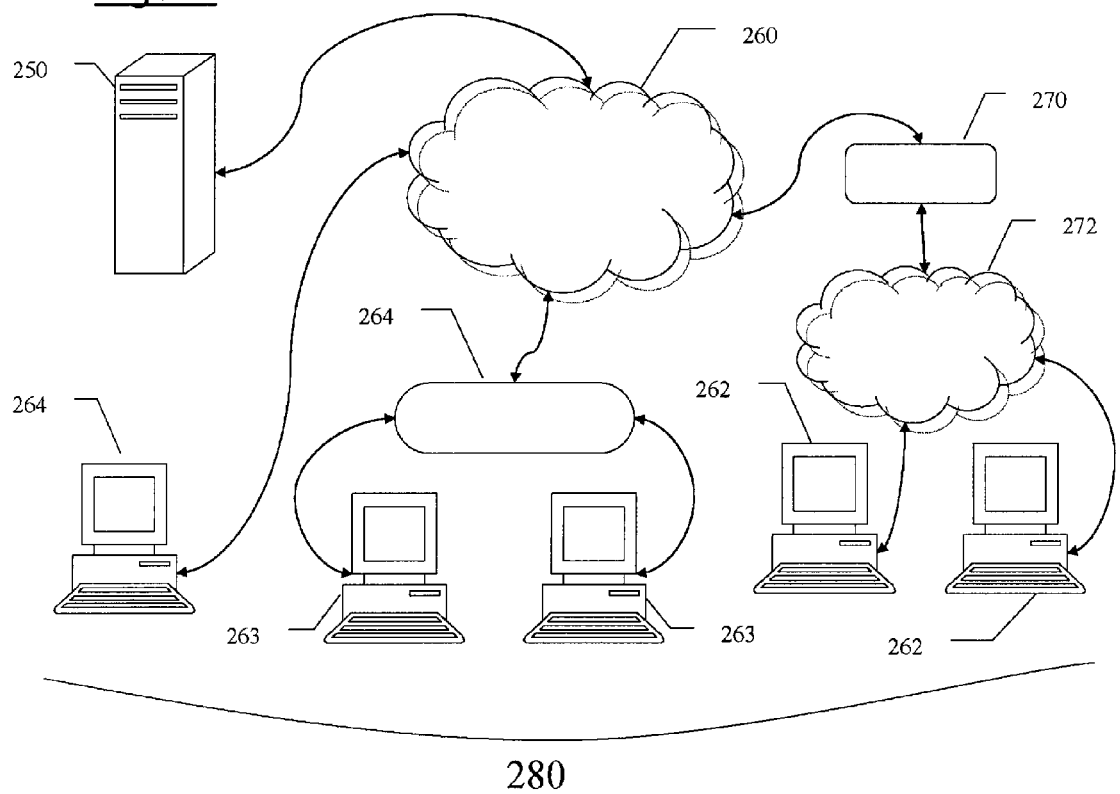
FIG. 6 illustrates a network environment in which an example embodiment may operate.

Referring now to FIG. 6, a diagram illustrates the network environment in which an example embodiment may operate. In this conventional network architecture, a server computer system 250 is coupled to a wide-area network 260. Wide-area network 260 includes the Internet, or other proprietary networks, which are well known to those of ordinary skill in the art. Wide-area network 260 may include conventional network backbones, long-haul telephone lines, Internet service providers, various levels of network routers, and other conventional means for routing data between computers. Using conventional network protocols, server 250 may communicate through wide-area network 260 to a plurality of client computer systems 262, 263, and 264 connected through wide-area network 260 in various ways. For example, client 264 is connected directly to wide-area network 260 through direct or dial-up telephone or other network transmission line. Alternatively, clients 263 may be connected through wide-area network 260 using a modem pool 264. A conventional modem pool 264 allows a plurality of client systems to connect with a smaller set of modems in modem pool 264 for connection through wide-area network 260. In another alternative network topology, wide-area network 260 is connected to a gateway computer 270. Gateway computer 270 is used to route data to clients 262 through a subnet and local area network (LAN) 272. In this manner, clients 262 can communicate with each other through local area network 272 or with server 250 through gateway 270 and wide-area network 260.

Using one of a variety of network connection means, server computer 250 can communicate with client computers 280 using conventional means. In a particular implementation of this network configuration, a server computer 250 may operate as a web server if the Internet's World-Wide Web (WWW) is used for wide area network 260. Using the HTTP protocol and the HTML coding language across wide-area network 260, web server 250 may communicate across the World-Wide Web with clients 280. In this configuration, clients 280 use a client application program known as a web browser such as the Internet Explorer™ published by Microsoft Corporation of Redmond, Wash., the user interface of America On-Line™, or the web browser or HTML renderer of any other supplier. Using such conventional browsers and the World-Wide Web, clients 280 may access image, graphical, and textual data provided by web server 250 or they may run Web application software. Conventional means exist by which clients 280 may supply information to web server 250 through the World Wide Web 260 and the web server 250 may return processed data to clients 280.

Figure 7A:
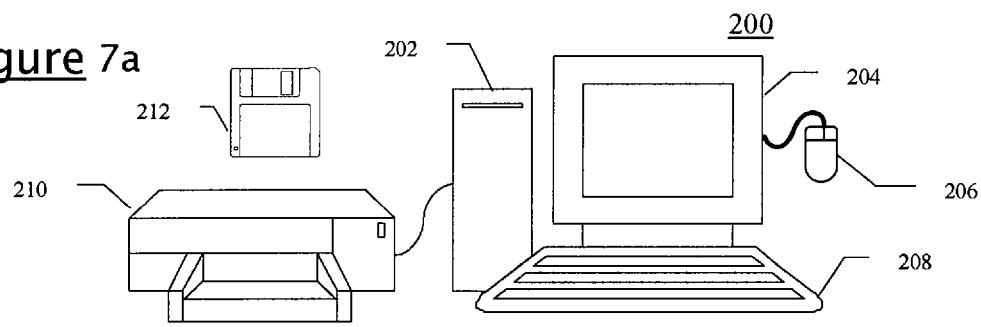
FIGS. 7a and 7b show an exemplary computer system in which the features of an example embodiment may be implemented.
Figure 7B:
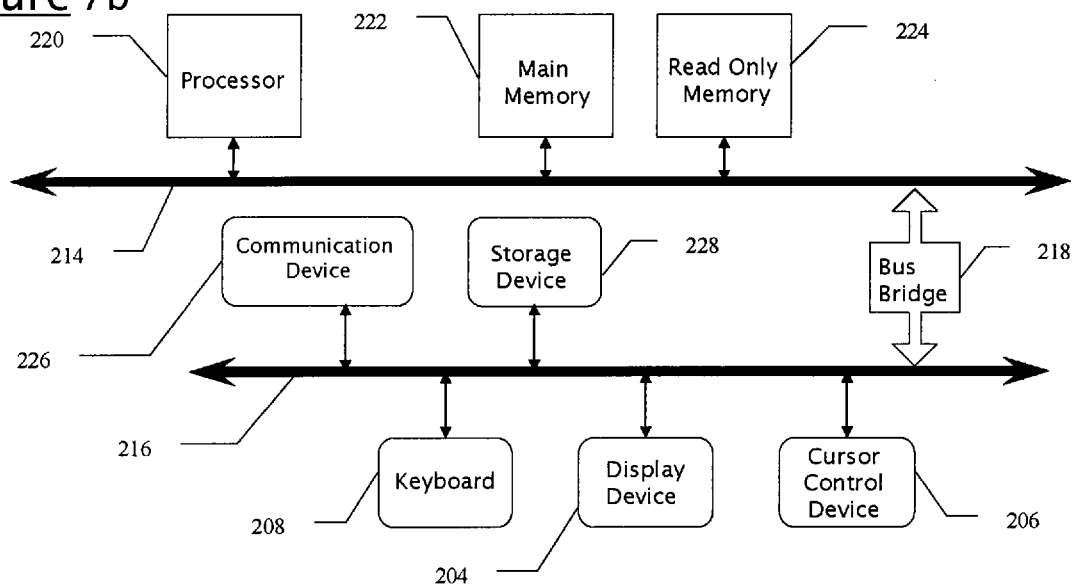

Having briefly described one embodiment of the network environment in which an example embodiment may operate, FIGS. 7a and 7b show an example of a computer system 200 illustrating an exemplary client 280 or server 250 computer system, in which the features of an example embodiment may be implemented. Computer system 200 is comprised of a bus or other communications means 214 and 216 for communicating information, and a processing means such as processor 220 coupled with bus 214 for processing information. Computer system 200 further comprises a random access memory (RAM) or other dynamic storage device 222 (commonly referred to as main memory), coupled to bus 214 for storing information and instructions to be executed by processor 220. Main memory 222 also may be used for storing temporary variables or other intermediate information during execution of instructions by processor 220. Computer system 200 also comprises a read only memory (ROM) and/or other static storage device 224 coupled to bus 214 for storing static information and instructions for processor 220.

An optional data storage device 228 such as a magnetic disk or optical disk and its corresponding drive may also be coupled to computer system 200 for storing information and instructions. Computer system 200 can also be coupled via bus 216 to a display device 204, such as a cathode ray tube (CRT) or a liquid crystal display (LCD), for displaying information to a computer user. For example, image, textual, video, or graphical depictions of information may be presented to the user on display device 204. Typically, an alphanumeric input device 208, including alphanumeric and other keys is coupled to bus 216 for communicating information and/or command selections to processor 220. Another type of user input device is cursor control device 206, such as a conventional mouse, trackball, or other type of cursor direction keys for communicating direction information and command selection to processor 220 and for controlling cursor movement on display 204.

Alternatively, the client 280 can be implemented as a network computer or thin client device. Client 280 may also be a laptop or palm-top computing device, such as the Palm Pilot™. Client 280 could also be implemented in a robust cellular telephone, where such devices are currently being used with Internet micro-browsers. Such a network computer or thin client device does not necessarily include all of the devices and features of the above-described exemplary computer system; however, the functionality of an example embodiment or a subset thereof may nevertheless be implemented with such devices.

A communication device 226 is also coupled to bus 216 for accessing remote computers or servers, such as web server 250, or other servers via the Internet, for example. The communication device 226 may include a modem, a network interface card, or other well-known interface devices, such as those used for interfacing with Ethernet, Token-ring, or other types of networks. In any event, in this manner, the computer system 200 may be coupled to a number of servers 250 via a conventional network infrastructure such as the infrastructure illustrated in FIG. 6 and described above.

The system of an example embodiment includes software, information processing hardware, and various processing steps, which are described above. The features and process steps of example embodiments may be embodied in machine or computer executable instructions. The instructions can be used to cause a general purpose or special purpose processor, which is programmed with the instructions to perform the steps of an example embodiment. Alternatively, the features or steps may be performed by specific hardware components that contain hard-wired logic for performing the steps, or by any combination of programmed computer components and custom hardware components. While embodiments are described with reference to the Internet, the method and apparatus described herein is equally applicable to other network infrastructures or other data communications systems.

Various embodiments are described. In particular, the use of embodiments with various types and formats of data structures may be described. It will be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

The software and/or data described herein may further be transmitted or received over a network 260 via the communication device 226 utilizing any one of a number of well-known transfer protocols, for example, the hyper text transfer protocol (HTTP). While the machine-readable medium 212 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, and optical and magnetic media.

Although the present specification describes components and functions implemented in the embodiments with reference to particular standards and protocols, the disclosed subject matter may be not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

Thus, as described above, a system and method for improved efficiency and security in spoke-to-spoke network communication is disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

We claim:

1. A method comprising:
   registering a spoke with a hub;
   updating a hub registration table with spoke registration information;
   sending the updated hub registration table to a plurality of registered spokes;
   using information in the updated hub registration table at a sending spoke to resolve an address of a receiving spoke without accessing the hub, the information in the updated hub registration table at the sending spoke including information sufficient to resolve the address of the receiving spoke even if the sending spoke has not previously sent traffic to the receiving spoke since the sending spoke registered with the hub;
   using information in the updated hub registration table at the sending spoke to encrypt traffic to be sent to the receiving spoke without accessing the hub; and
   sending the encrypted traffic directly to the receiving spoke without sending the encrypted traffic via the hub.

2. The method as claimed in claim 1 including using information in the updated hub registration table at a receiving spoke to decrypt traffic received from the sending spoke without accessing the hub and determining if a tunnel has been established with the receiving spoke.

3. The method as claimed in claim 1 including determining if a tunnel has been established with the receiving spoke.

4. The method as claimed in 1 including obtaining a subnet and a corresponding public key value of the receiving spoke from the updated hub registration table at the sending spoke without accessing the hub, combining the public key value of the receiving spoke with a private key value of the sending spoke to form an encryption key, using the encryption key to create a tunnel to the receiving spoke, and sending the encrypted traffic via the tunnel without transiting the hub.

5. The method as claimed in claim 1 wherein registering a spoke with a hub further including providing spoke registration information including an IP address, a subnet, and a public key value for a registering spoke.

6. The method as claimed in claim 5 including, if a tunnel has not been established with the receiving spoke, obtaining the subnet and the corresponding public key value of the receiving spoke from the updated hub registration table at the sending spoke, combining the public key value of the receiving spoke with a private key value of the sending spoke to form an encryption key, using the encryption key to create a tunnel to the receiving spoke, and sending the encrypted traffic via the tunnel without transiting the hub.

7. The method as claimed in claim 1 wherein the hub maintains the updated hub registration table, the method further including receiving an updated copy of the hub registration table at the first spoke.

8. The method as claimed in claim 1 wherein traffic to be sent to another spoke is encrypted using a Diffie-Hellman key.

9. A method comprising:
   registering a first spoke with a hub by providing to the hub first spoke registration information including an IP address, a subnet, and a public key value for the first spoke;
   receiving an updated hub registration table from the hub, the updated hub registration table including spoke registration information for a plurality of spokes;
   using information in the updated hub registration table at the first spoke to resolve an address of a second spoke without accessing the hub, the information in the updated hub registration table at the first spoke including information sufficient to resolve the address of the second spoke even if the first spoke has not previously sent traffic to the second spoke since the first spoke registered with the hub;
   using information in the updated hub registration table at the first spoke to encrypt traffic to be sent to a second spoke without accessing the hub; and
   sending the encrypted traffic directly from the first spoke to the second spoke without sending the encrypted traffic via the hub.

10. The method as claimed in claim 9 including determining if a tunnel has been established between the first spoke and the second spoke.

11. The method as claimed in claim 9 including obtaining the subnet and the corresponding public key value of the second spoke from the updated hub registration table at the first spoke, combining the public key value of the second spoke with a private key value of the first spoke to form an encryption key, using the encryption key to create a tunnel between the first spoke and the second spoke, and sending encrypted traffic via the tunnel without transiting the hub.

12. A method comprising:
   determining if a tunnel has been established between a first spoke and a second spoke; and
   if a tunnel has not been established between the first spoke and the second spoke, obtaining a subnet address and a corresponding public key value of the second spoke from a hub registration table at the first spoke without accessing the hub, combining the public key value of the second spoke with a private key value of the first spoke to form an encryption key, using the encryption key to create a tunnel between the first spoke and the second spoke, using information in the hub registration table at the first spoke to encrypt traffic to be sent to the second spoke without accessing the hub, the information in the hub registration table at the first spoke including information sufficient to encrypt traffic to be sent to the second spoke even if the first spoke has not previously sent traffic to the second spoke since the first spoke registered with the hub, and sending the encrypted traffic directly from the first spoke to the second spoke without sending the encrypted traffic via a hub.

13. The method as claimed in claim 12 wherein the hub maintains the hub registration table, the method further including receiving an updated copy of the hub registration table at the first spoke.

14. The method as claimed in claim 12 wherein encrypted traffic to be sent via the tunnel is encrypted using a Diffie-Hellman key.

15. A method comprising:
receiving encrypted traffic from a first spoke;
determining if a tunnel has been established between the first spoke and a second spoke; and
if a tunnel has not been established between the first spoke and the second spoke, obtaining an IP address of the first spoke and a corresponding public key value of the first spoke from a hub registration table at the second spoke without accessing the hub, combining the public key value of the first spoke with a private key value of the second spoke to form a decryption key, using the decryption key to create a tunnel between the first spoke and the second spoke, and using information in the hub registration table at the second spoke to decrypt traffic received from the first spoke without accessing the hub, the information in the hub registration table at the second spoke including information sufficient to decrypt traffic received from the first spoke even if the second spoke has not previously received traffic from the first spoke since the second spoke registered with the hub, the encrypted traffic being received directly from the first spoke at the second spoke without being sent via a hub.

16. The method as claimed in claim 15 wherein the hub maintains the hub registration table, the method further including receiving an updated copy of the hub registration table at the second spoke.

17. The method as claimed in claim 15 wherein the encrypted traffic is encrypted using a Diffie-Hellman key.

18. An apparatus comprising:
means for registering a spoke with a hub;
means for updating a hub registration table with spoke registration information;
means for sending the updated hub registration table to a plurality of registered spokes;
means for using information in the updated hub registration table at a sending spoke to resolve an address of a receiving spoke without accessing the hub, the information in the updated hub registration table at the sending spoke including information sufficient to resolve the address of the receiving spoke even if the sending spoke has not previously sent traffic to the receiving spoke since the sending spoke registered with the hub;
using information in the updated hub registration table at the sending spoke to encrypt traffic to be sent to the receiving spoke without accessing the hub; and
means for sending the encrypted traffic directly to a receiving spoke without sending the encrypted traffic via the hub.

19. The apparatus as claimed in claim 18 including means for using information in the updated hub registration table at a receiving spoke to decrypt traffic received from the sending spoke without accessing the hub and means for determining if a tunnel has been established with the receiving spoke.

20. The apparatus as claimed in claim 18 including means for determining if a tunnel has been established with the receiving spoke.

21. The apparatus as claimed in claim 18 including means for obtaining a subnet and a corresponding public key value of the receiving spoke from the updated hub registration table at the sending spoke without accessing the hub, means for combining the public key value of the receiving spoke with a private key value of the sending spoke to form an encryption key, means for using the encryption key to create a tunnel to the receiving spoke, and means for sending the encrypted traffic via the tunnel without transiting the hub.

22. The apparatus as claimed in claim 18 wherein the means for registering a spoke with a hub further including means for providing spoke registration information including an IP address, a subnet, and a public key value for a registering spoke.

23. An apparatus comprising:
means for receiving encrypted traffic from a first spoke;
means for determining if a tunnel has been established between the first spoke and a second spoke; and
if a tunnel has not been established between the first spoke and the second spoke, means for obtaining an IP address of the first spoke and a corresponding public key value of the first spoke from a hub registration table at the second spoke without accessing the hub, means for combining the public key value of the first spoke with a private key value of the second spoke to form a decryption key, means for using the decryption key to create a tunnel between the first spoke and the second spoke, and means for using information in the hub registration table at the second spoke to decrypt traffic received from the first spoke without accessing the hub, the information in the hub registration table at the second spoke including information sufficient to decrypt traffic received from the first spoke even if the second spoke has not previously received traffic from the first spoke since the second spoke registered with the hub, the encrypted traffic being received directly from the first spoke at the second spoke without being sent via a hub.

24. The apparatus as claimed in claim 23 wherein the hub maintains the hub registration table, the apparatus further including means for receiving an updated copy of the hub registration table at the second spoke.

25. The apparatus as claimed in claim 23 wherein the encrypted traffic is encrypted using a Diffie-Hellman key.

26. An article of manufacture comprising at least one non-transitory machine readable storage medium having one or more computer programs stored thereon and operable on one or more computing systems to:
register a spoke with a hub;
update a hub registration table with spoke registration information;
send the updated hub registration table to a plurality of registered spokes;
use information in the updated hub registration table at a sending spoke to resolve an address of a receiving spoke without accessing the hub, the information in the updated hub registration table at the sending spoke including information sufficient to resolve the address of the receiving spoke even if the sending spoke has not previously sent traffic to the receiving spoke since the sending spoke registered with the hub;

use information in the updated hub registration table at the sending spoke to encrypt traffic to be sent to the receiving spoke without accessing the hub; and send the encrypted traffic directly to a receiving spoke without sending the encrypted traffic via the hub.

27. The article of manufacture as claimed in claim 26 being further operable to determine if a tunnel has been established with the receiving spoke and, if a tunnel has not been established with the receiving spoke, obtaining a subnet and a corresponding public key value of the receiving spoke from the updated hub registration table at the sending spoke without accessing the hub, combining the public key value of the receiving spoke with a private key value of the sending spoke to form an encryption key without accessing the hub, using the encryption key to create a tunnel to the receiving spoke, and sending the encrypted traffic via the tunnel without transiting the hub.

28. An article of manufacture comprising at least one machine readable storage medium having one or more computer programs stored thereon and operable on one or more computing systems to:

receive encrypted traffic from a first spoke;

determine if a tunnel has been established between the first spoke and a second spoke; and if a tunnel has not been established between the first spoke and the second spoke, obtain an IP address of the first spoke and a corresponding public key value of the first spoke from a hub registration table at the second spoke without accessing the hub, combine the public key value of the first spoke with a private key value of the second spoke to form a decryption key, use the decryption key to create a tunnel between the first spoke and the second spoke, and use information in the hub registration table at the second spoke to decrypt traffic received from the first spoke without accessing the hub, the information in the hub registration table at the second spoke including information sufficient to decrypt traffic received from the first spoke even if the second spoke has not previously received traffic from the first spoke since the second spoke registered with the hub, the encrypted traffic being received directly from the first spoke at the second spoke without being sent via a hub.

29. The article of manufacture as claimed in claim 28 wherein the encrypted traffic is encrypted using a Diffie-Hellman key.

30. A system comprising:

a hub to retain a hub registration table; and one or more spokes in data communication with the hub via a network, the spokes being programmed to:

register with the hub;

receive an updated hub registration table from the hub;

use information in the updated hub registration table at a sending spoke to resolve an address of a receiving spoke without accessing the hub, the information in the updated hub registration table at the sending spoke including information sufficient to resolve the address of the receiving spoke even if the sending spoke has not previously sent traffic to the receiving spoke since the sending spoke registered with the hub;

use information in the updated hub registration table at the sending spoke to encrypt traffic to be sent to the receiving spoke without accessing the hub; and send the encrypted traffic directly to a receiving spoke without sending the encrypted traffic via the hub.

31. The system according to claim 30 being further operable to determine if a tunnel has been established with the receiving spoke and, if a tunnel has not been established with the receiving spoke, obtaining a subnet and a corresponding public key value of the receiving spoke from the updated hub registration table at the sending spoke without accessing the hub, combining the public key value of the receiving spoke with a private key value of the sending spoke to form an encryption key without accessing the hub, using the encryption key to create a tunnel to the receiving spoke, and sending the encrypted traffic via the tunnel without transiting the hub.

* * * * *